(12) United States Patent
Man (10) Patent No.: US 11,304,558 B1
(45) Date of Patent: *Apr. 19, 2022

(54) DOUBLE AIR FRYER OVEN

(71) Applicant: Zhejiang Biyi Electric Appliance Co. Ltd., Yuyao (CN)

(72) Inventor: Kaimong Man, Yuyao (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/337,495

(22) Filed: Jun. 3, 2021

Related U.S. Application Data (63) Continuation-in-part of application No. 17/168,462, filed on Feb. 5, 2021, now Pat. No. 11,045,046.

(51) Int. Cl.
*A47J 36/00* (2006.01)
*A47J 37/06* (2006.01)

(52) U.S. Cl.
CPC .......... *A47J 36/00* (2013.01); *A47J 37/0641* (2013.01)

(58) Field of Classification Search
CPC ........ A47J 37/0641; A47J 27/00; A47J 27/08; A47J 27/09; A47J 27/092; A47J 36/025; A47J 36/06; A47J 36/08; A47J 36/10; A47J 36/12; A47J 36/165; A47J 36/18; A47J 36/20; A47J 36/22; A47J 37/00; A47J 37/12; A47J 37/1204; A47J 37/1209; A47J 37/1214; A47J 37/1219; A47J 37/1266; A47J 37/1285; A47J 37/129; A47J 37/1295
USPC .......... 99/324, 325, 330–343, 369, 400–418, 99/422, 425, 426, 430, 440, 444, 447, 99/448, 449, 451, 483, 495, 501
See application file for complete search history.

(56) References Cited

U.S. PATENT DOCUMENTS

| | | | |
|---|---|---|---|
| 2009/0126580 A1* | 5/2009 | Hartfelder | A47J 39/006 99/483 |
| 2017/0231430 A1* | 8/2017 | Moon | A47J 37/1266 99/331 |

* cited by examiner

*Primary Examiner* — Phuong T Nguyen
(74) *Attorney, Agent, or Firm* — Frank Marino (57) ABSTRACT

An air frying appliance has a housing with an open interior and a plurality of air frying systems each including a heating element for heating air and a fan for circulating the heated air. One or more removable partitions are adapted to create open interior portions equal in plurality to the plurality of air frying systems, each open portion in communication with one of the air frying systems. One or more open-topped primary pots are adapted for insertion into the open interior and adapted to cooperate with one or all of the air frying systems to create one or more cooking chambers within which the heated air is circulated. Each air frying system is controllable to cause one or both of its fan and heating element to operate independently.

10 Claims, 16 Drawing Sheets

DOUBLE AIR FRYER OVEN

RELATED APPLICATIONS

This application is a Continuation-in-Part of pending application Ser. No. 17/168,462, filed on 5 Feb. 2021, which claims priority to Chinese Application S/N 202011644520.8, filed on 31 Dec. 2020. All of the teaching of both are incorporated herein by reference.

FIELD OF THE INVENTION

The invention relates to cooking appliances, and specifically to electric countertop air fryers.

BACKGROUND

Air fryers use very hot turbulent air to "fry" food as an alternative to deep frying the food in hot oil or fat as in a deep fryer. During operation, the hot turbulent air removes moisture on the outer surfaces of the food to make it as crispy as food cooked by deep frying of frying. A heating element heats the air within a food-containing frying pot that is removably disposed within a cooking chamber. A motorized fan turbulizes the heated air within the chamber. The outer surface of food is dried by the hot turbulent air so that its surface is dehydrated and becomes golden and crispy. The food is fried using only the natural oils within the food itself. The appearance, taste, and texture of the air fried food mimics that of fattier and less heathy deep-fried food.

Existing air fryers have either single chamber arrangements or double chamber arrangements. A double chamber air fryer can cook two different foods simultaneously. But such are incapable of cooking larger portions because the cooking chambers are too small. And while a single chamber air fryer can cook larger foods or food portions, it does not enable the cooking of smaller portions of different foods independently. For instance, Publication 2017/0231430 teaches an air fryer having a single pot with a removable partition to divide the pot into two cooking chambers, but only a single air frying system is provided, so both chambers must be heated to the same temperature and cook for the same amount of time, so such an arrangement is effectively only useful for cooking two identical portions of the same food to the same degree.

SUMMARY

The invention may be exemplified by or may use an air frying appliance that allows selection of either two or more small side-by-side air fryers or one large air fryer. The appliance includes two or more air frying systems to heat and circulate air, and those systems may be operated independently when the two or more small air fryers are selected or may be synced to operate equally when the large air fryer is selected. One or more removable partitions may be included. The removable partition(s) may be shaped and arranged to enhance the circulation of the heated air.

The air fryer may include a body having the air frying systems within, three or more open-topped pots which each together with its associated air frying system creates one of the cooking chambers, and removable partitions. The body may include a housing, having an open front portion and in open interior to receive the partition(s) and pots within. And the air frying systems may each include a heating element and a fan.

The partitions may be removably installable through the front opening and within the open interior, each between two adjacent cooking chambers to thereby define and separate the cooking chambers. The open interior may include horizontal grooves for sliding the vertical partition(s) in and out and to ensure that the partition(s) are properly positioned. The top(s) and bottom(s) of the partition(s) may fit slidingly into upper and lower grooves, respectively, to engage the partition(s) into the interior and between the adjacent cooking chambers When multiple air fryers are desired, the partition(s) may be inserted and the small pots may be employed with/under each air frying system. The air frying systems may then be operated independently to each cook a different food most effectively, to cook at/for different times, or to cook at different temperatures.

When a single larger air fryer is desired, the partition(s) may be removed and a single larger pot may be employed with under all air frying systems. The air frying systems may then be synced to operate together to cook one food most effectively, for the same time, and at the same temperature.

The air fryer may thereby be selectively used as a single large air fryer or a multiple smaller independent air fryers.

Each air frying system may include a thermal barrier disposed between the heating element and the associated cooking compartment. This barrier protects the food from being burned on its top surface by direct exposure to the heating element and ensures that cooking is accomplished only via turbulized heated air, which flows around the barrier and into the cooking chamber to cook the food evenly.

Each pot may have a handle to facilitate the holding of the pot without getting burned.

Alternatively, the air frying appliance may be provided with only the two or more smaller pots and associated air frying systems, thereby allowing the user to operate each cooking chamber independently to each cook a different food most effectively, to cook at/for different times, or to cook at different temperatures.

Still alternatively, the invention may be exemplified by or may use an otherwise similar air frying appliance except having a single large open-topped pot that allows selection of either two or more small side-by-side air fryers or one large air fryer by having its partition(s) slid vertically into vertical groves within the pot. The appliance may similarly include two or more air frying systems to heat and circulate air, and those systems may similarly be operated independently when the two or more small air fryers are selected or may be synced to operate equally when the large air fryer is selected. One or more removable partitions may be included.

The air fryer may include a body having the air frying systems within, and the two or more potential open-topped pot portions created by insertion of the partition(s) which each together with its associated air frying system creates one of the cooking chambers.

The partitions may be removably installable through the open top of the pot and within the open interior, each between two adjacent cooking chambers to thereby define and separate the cooking chambers.

When multiple air fryers are desired, the partition(s) may be inserted and the each small pot portion may be employed with/under each air frying system. The air frying systems may then be operated independently to each cook a different food most effectively, to cook at/for different times, or to cook at different temperatures.

When a single larger air fryer is desired, the partition(s) may be removed and the single large pot may be employed with under all air frying systems. The air frying systems may then be synced to operate together to cook one food most effectively, for the same time, and at the same temperature.

The air fryer may thereby be selectively used as a single large air fryer or a multiple smaller independent air fryers.

Each air frying system may similarly include a thermal barrier disposed between the heating element and the associated cooking compartment to protect the food from being burned on its top surface by direct exposure to the heating element and to ensure that cooking is accomplished only via turbulized heated air, which flows around the barrier and into the cooking chamber to cook the food evenly.

BRIEF DESCRIPTION OF THE DRAWINGS

The included Drawings are meant only to demonstrate aspects of the described embodiments and should not be used to limit the invention. In the Drawings.

DESCRIPTION OF EXEMPLARY EMBODIMENTS

FIGS. 1-10 depict a first air frying appliance having housing 111. The appliance includes two air frying systems, left system 132L+131L and right system 132R+131R to heat and circulate air, and those systems may be operated independently. Removable partition 120 is insertable between open interiors 123L and 123R by fitting slidingly between grooves, top groove 141T and bottom groove 141B. Two removable small open-topped pots, left pot 143L and right pot 143R, are positionable into the open interiors, left open interior 123L and right open interiors 123R, respectively, and directly under the left and right air frying systems, respectively, forming together with the left and right pots, respectively, left and right cooking chambers, left cooking chamber 132L+131L+143L and right cooking chamber 132R+131R+143R, respectively, and to thereby create a double side-by-side air fryer 100A.

Figure 8:
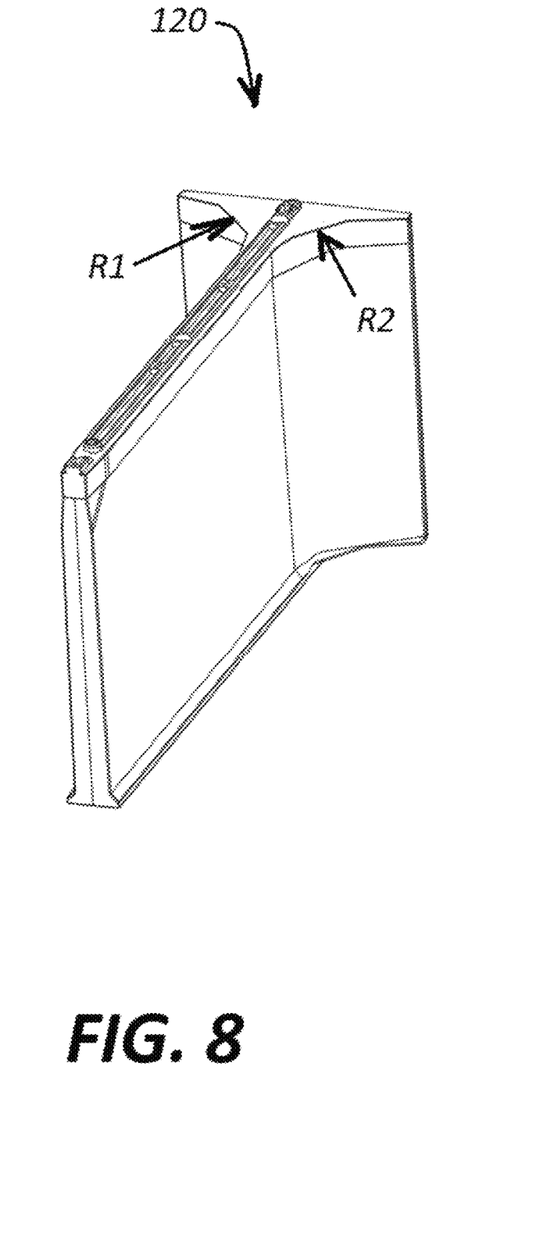
FIG. 8 is a perspective view of the partition of the air fryer of FIG. 1.
Figure 11:
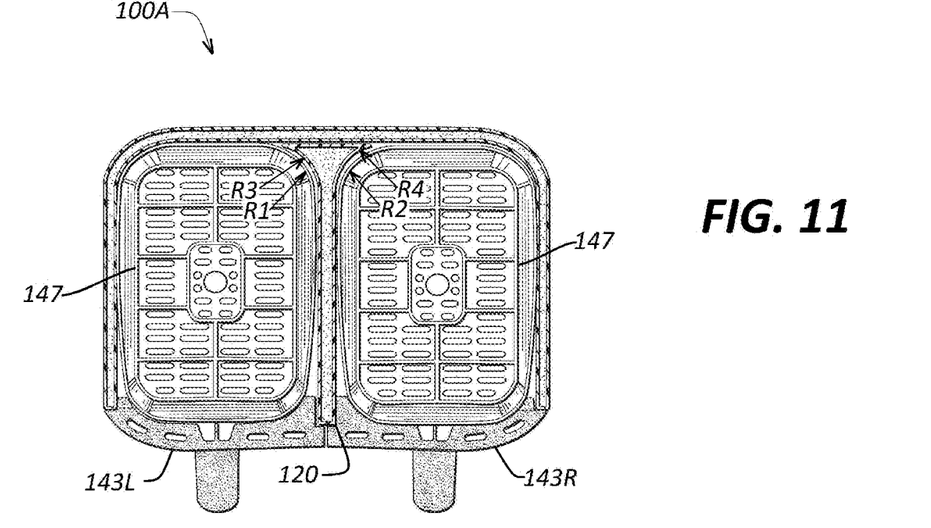
FIG. 11 is a top sectional view taken at line 11-11 of FIG. 1 with the smaller frying pots and the partition installed.

The partition is shaped and arranged to enhance the circulation of the heated air by having radius rear edges, R1 and R2, which match to radiused rear corners, R3 and R4, respectively, of the left and right pots when the pots are fully inserted into the open interiors, to thereby direct the circulating heated air smoothly and without sharp corners that would otherwise create dead spots.

Figure 1:
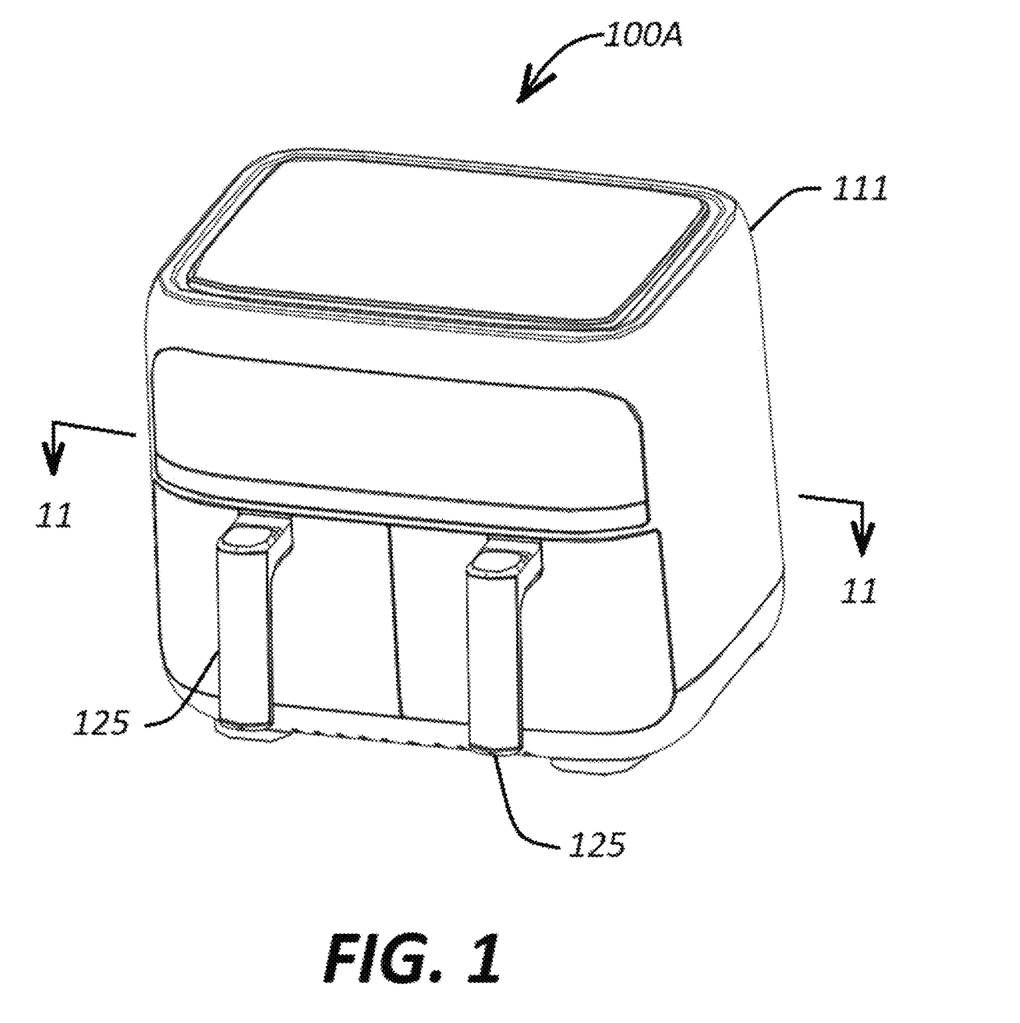
FIG. 1 is a perspective view of an exemplary first air fryer using two smaller frying pots.
Figure 2:
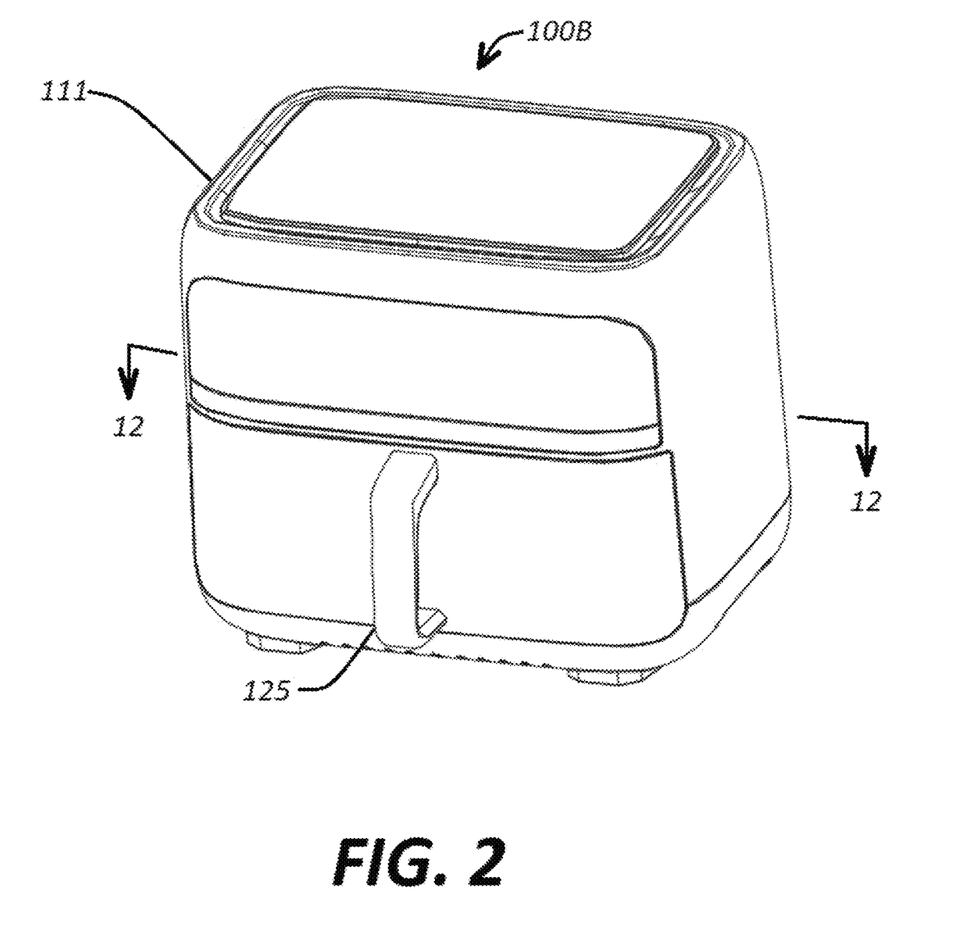
FIG. 2 is a perspective view of the air fryer of FIG. 1 using one larger frying pot.
Figure 3:
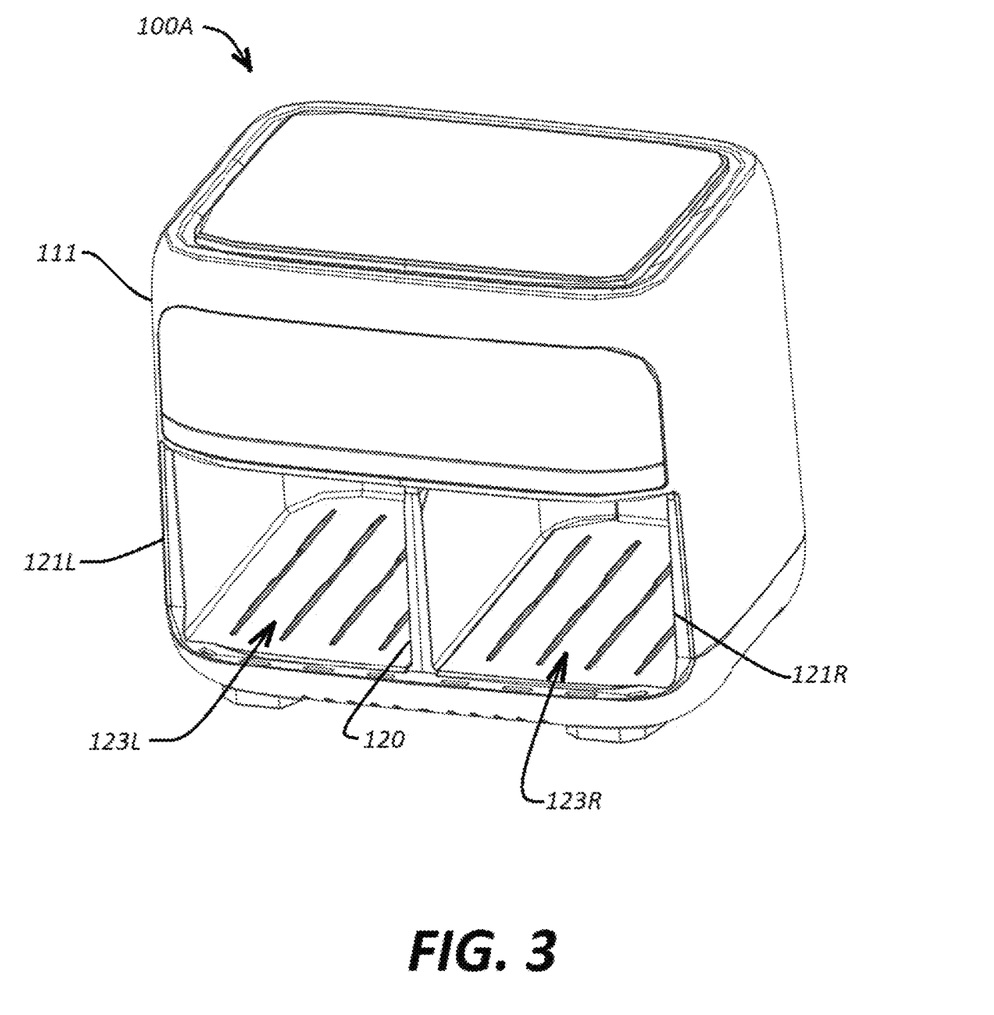
FIG. 3 is a perspective view of the air fryer of FIG. 1 with all frying pots removed and the partition installed.
Figure 12:
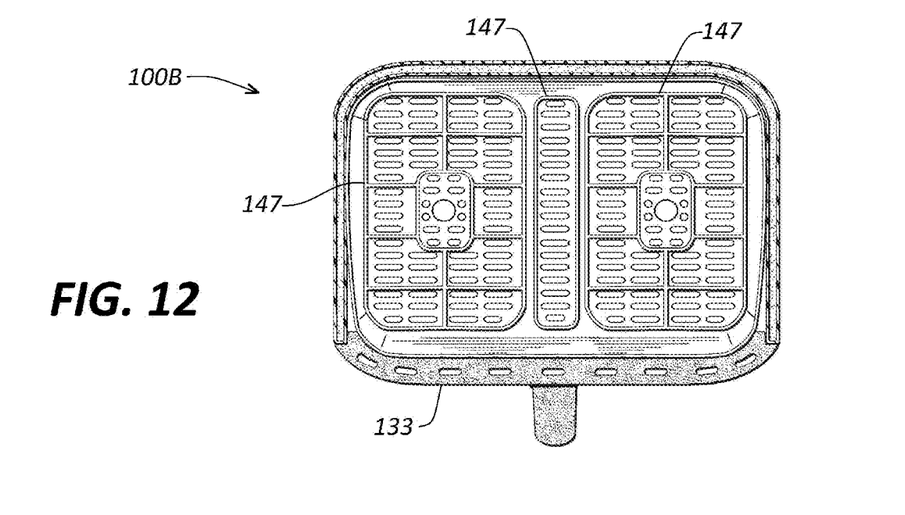
FIG. 12 is a top sectional view taken at line 12-12 of FIG. 2 with the partition removed and the larger frying pot installed.

Additionally or alternatively, the air frying systems may be synced to operate equally and a single large pot 133 may be employed with the partition removed, and the appliance may then function as a single larger air fryer 100B.

Figure 4:
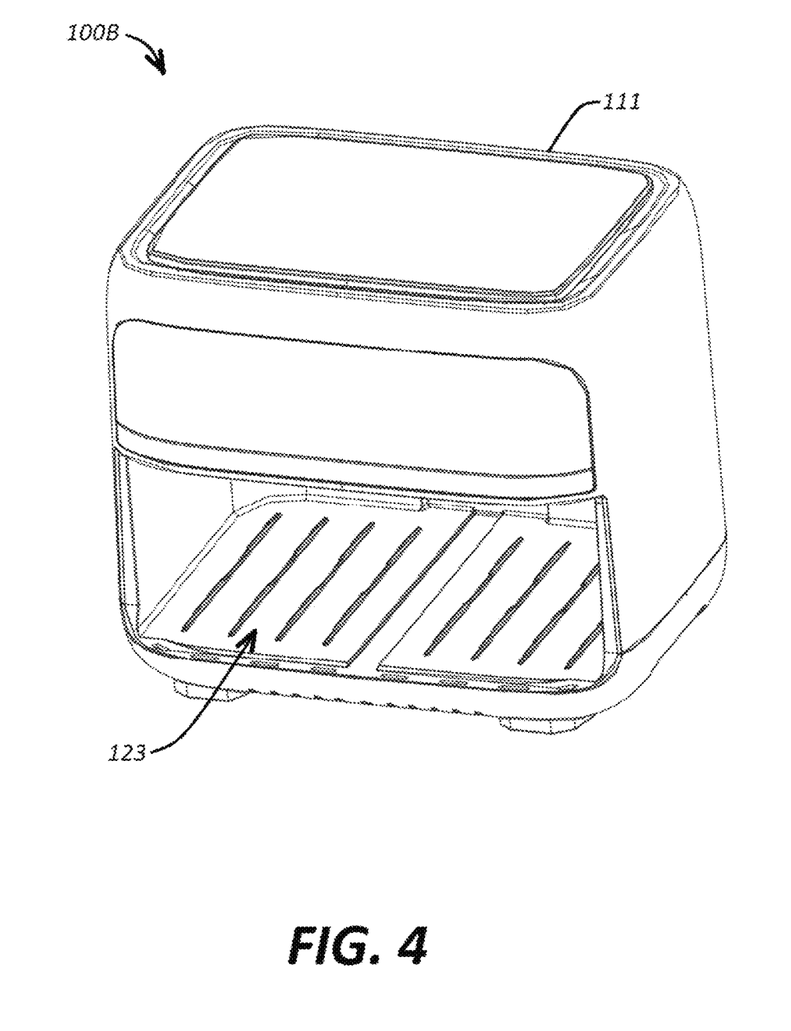
FIG. 4 is a perspective view of the air fryer of FIG. 1 with all frying pots and the partition removed.

The housing includes left open front 121L and right open front 121R, for receiving the left and right pots into the left and right open interiors, respectively.

Figure 9:
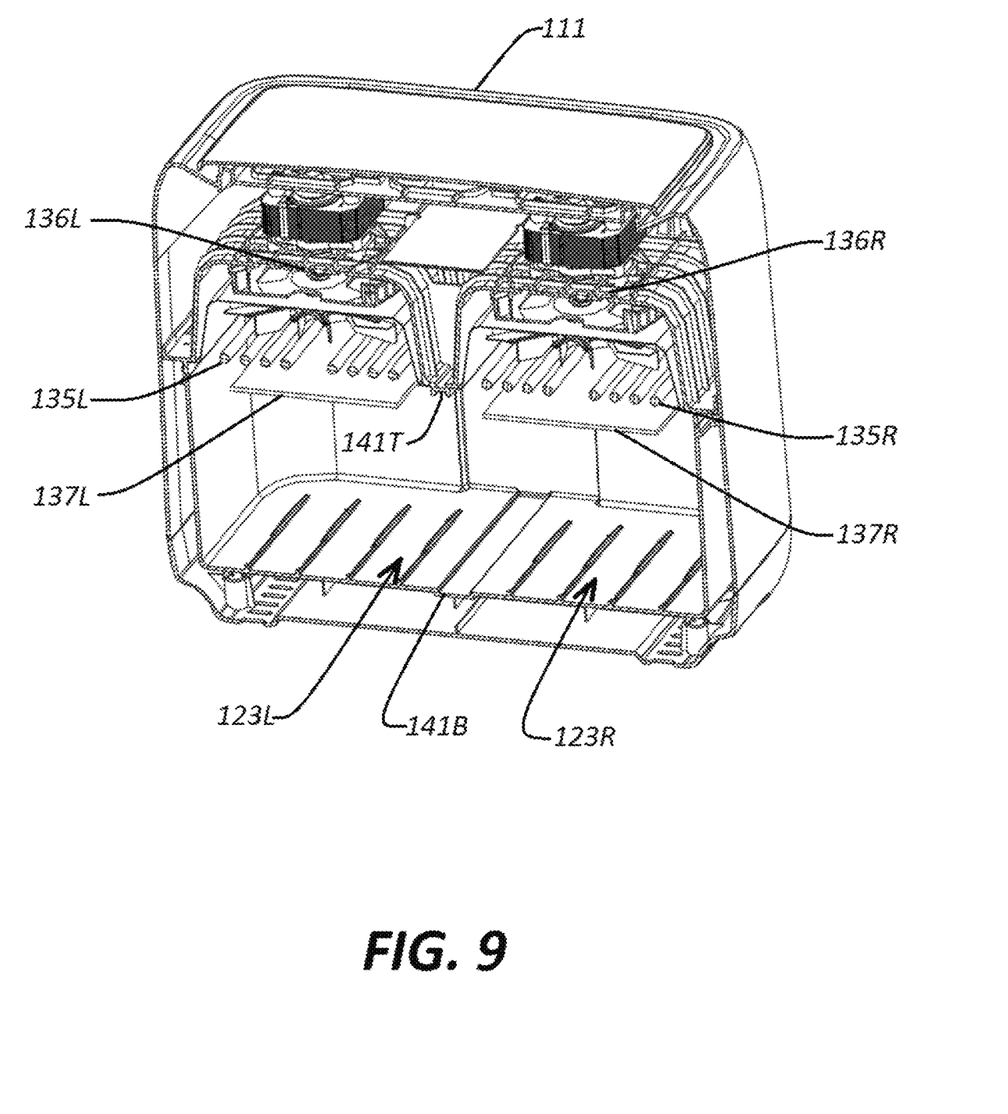
FIG. 9 is a perspective front sectional view through the air fryer of FIG. 1 with all frying pots and the partition removed.
Figure 10:
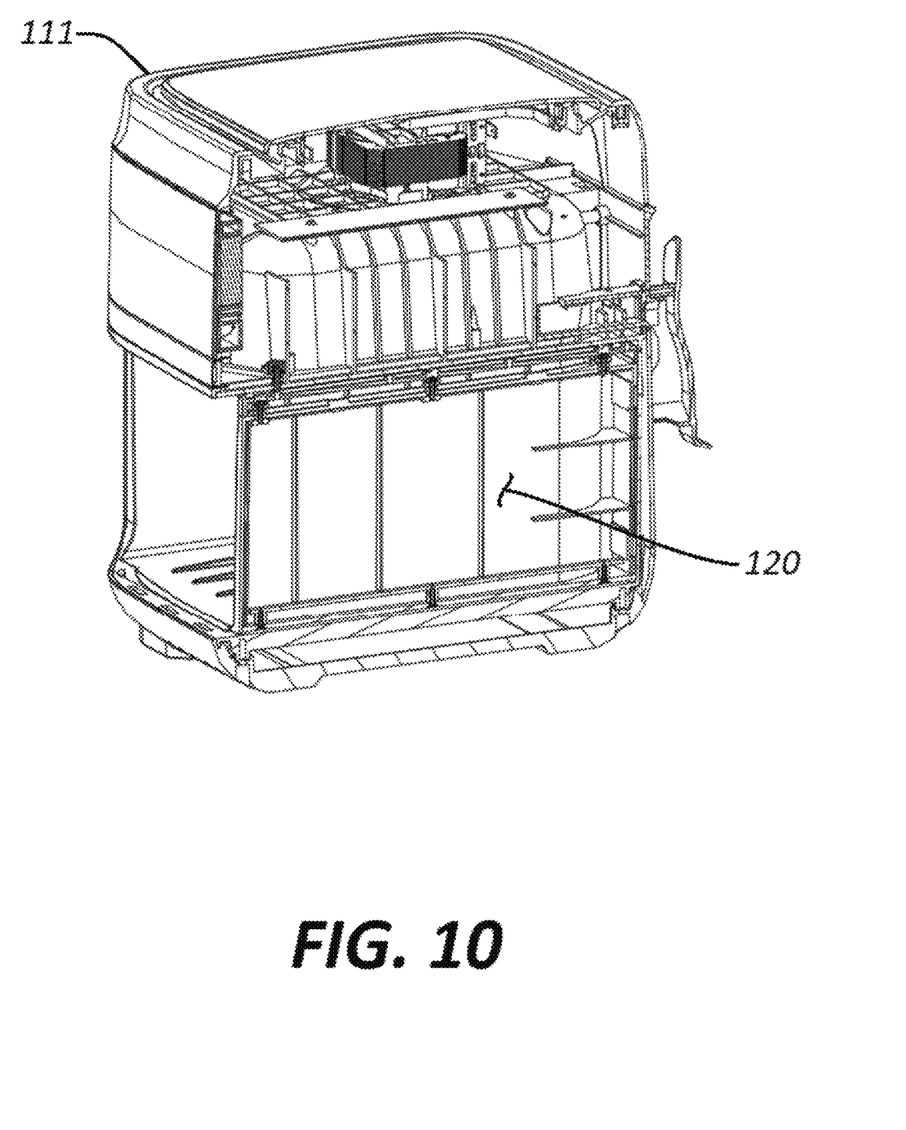
FIG. 10 is a perspective side sectional view through the air fryer of FIG. 1 with all frying pots removed and the partition installed.

The left and right air frying systems each include a heating element, 135L and 135R, respectively, and a fan 136L and 136R, respectively. Insulating barriers 137L and 137R are disposed between the left and right air frying systems, respectively, and their associated cooking chambers. This prevents exposure of food within the pots to direct radiant heat form the heating elements which would otherwise burn the top of the food before the entirety of the food was fully cooked. Heated air may flow around the insulating barriers to reach the food and ensure that the food is only cooked thereby.

The air frying systems may then be operated independently to each cook a different food most effectively, to cook at/for different times, or to cook at different temperatures.

Figure 5:
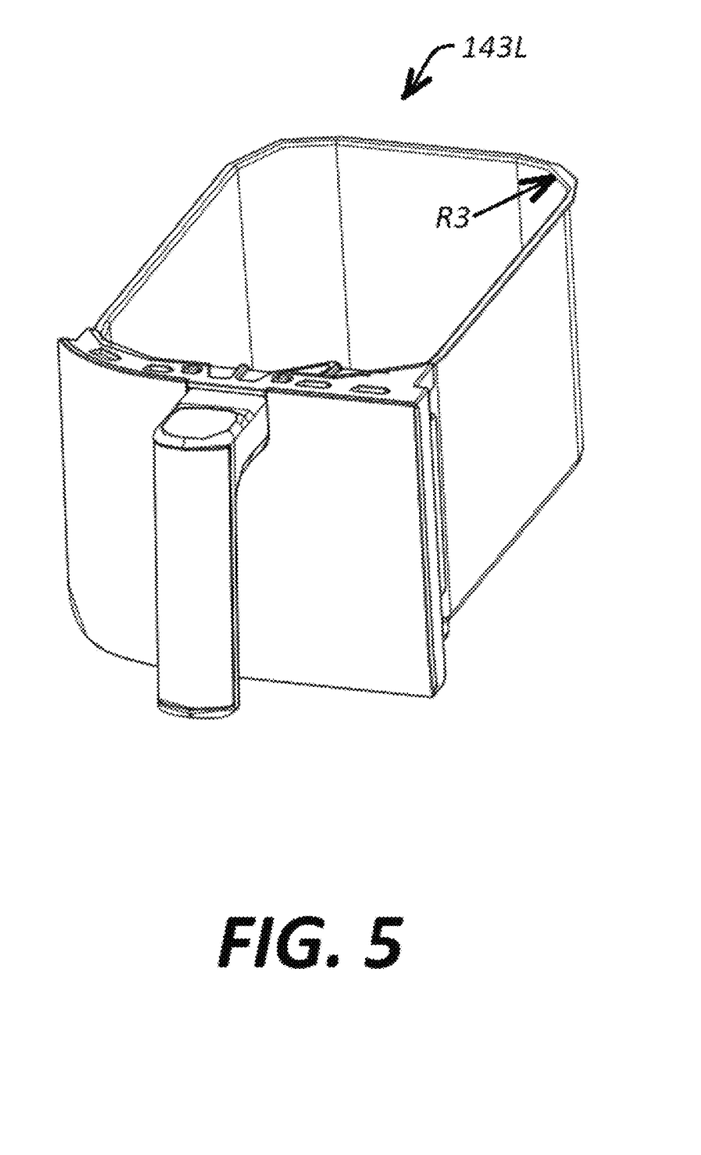
FIG. 5 is a perspective view of the left smaller frying pot of the air fryer of FIG. 1.
Figure 6:
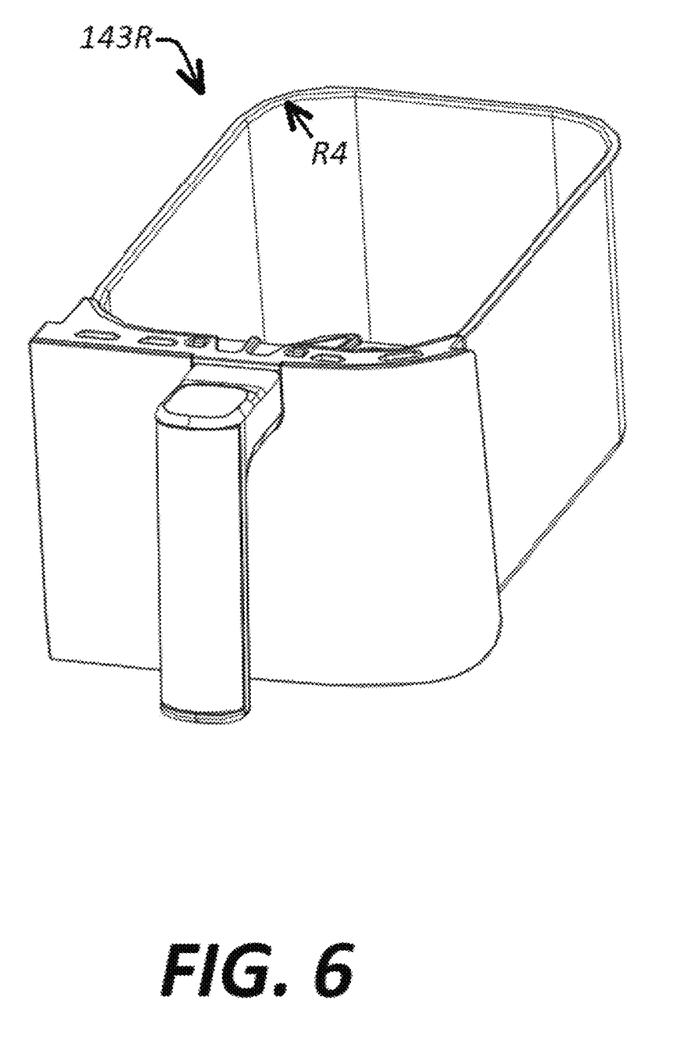
FIG. 6 is a perspective view of the right smaller frying pot of the air fryer of FIG. 1.
Figure 7:
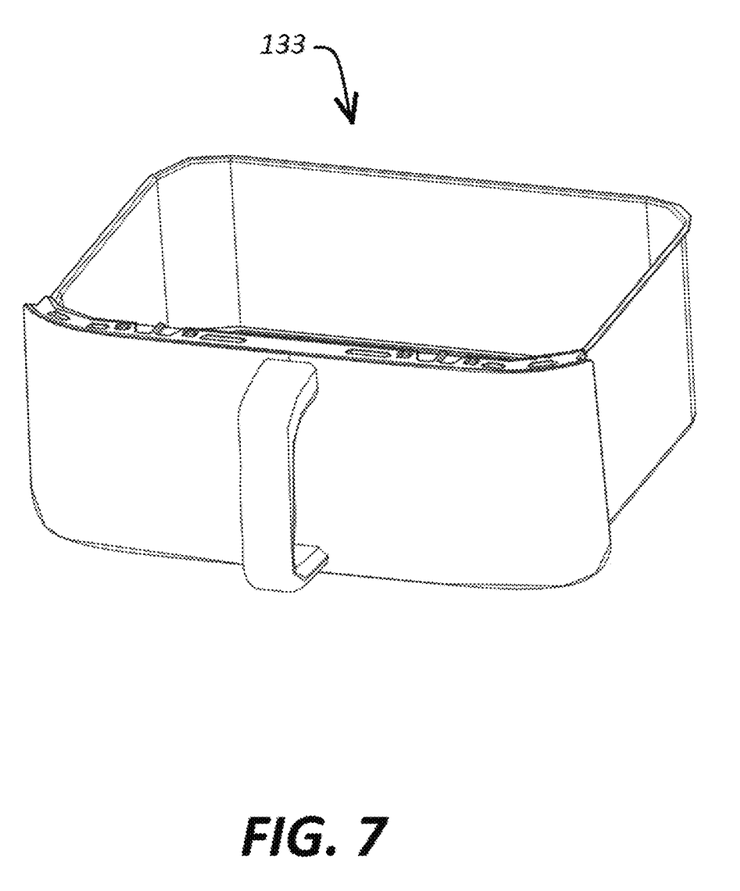
FIG. 7 is a perspective view of the larger frying pot of the air fryer of FIG. 1.

All pots include one or more perforated trays 147 spaced from the pot's bottom surface to support food within the pot and maintain a gap there-under for optimal circulation of the heated air all around the food.

All pots have a handle 125 to facilitate the holding of the pot by a user without getting burned.

FIGS. 11 through 17 depict a second air fryer 200 having housing 211 having left and right air frying systems within. as in the first embodiment, to heat and circulate air, and those systems may be operated independently. Removable partition 220 is insertable down into open-topped pot 233 by fitting slidingly between ribs, left rib 241L and right rib 241R inside the rear of the pot and similar ribs inside the front of the pot, to create left and right pot portions, 237L and 237R, which each together with their associated air frying systems create left and right cooking chambers, respectively. The open-topped pot is positionable into the housing similar to the first embodiment, directly under the left and right air frying systems, forming together with the left and right pot portions, respectively, left and right cooking chambers, respectively, and to thereby create a double side-by-side air fryer.

Figure 13:
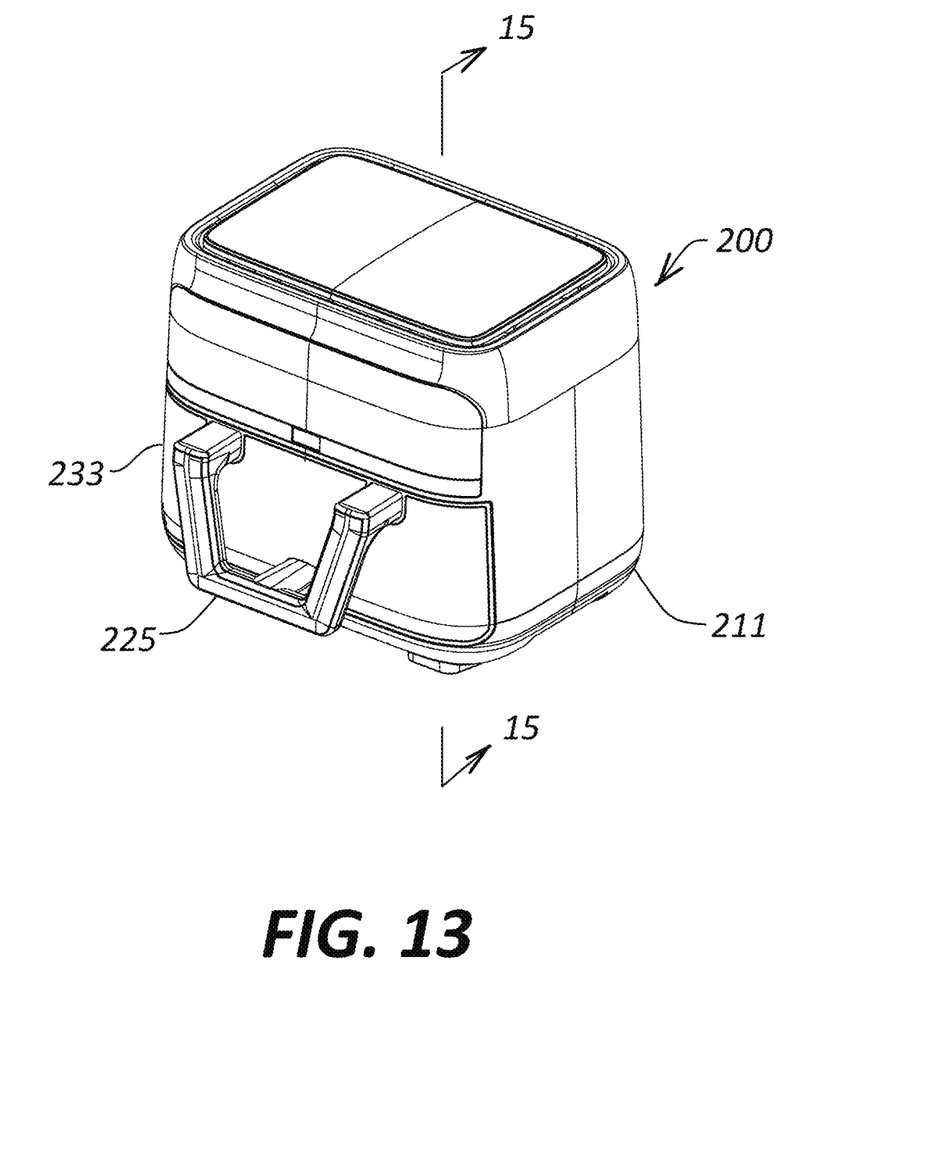
FIG. 13 is a perspective view of an exemplary second air fryer with its frying pot installed.

Additionally or alternatively, the air frying systems may be synced to operate equally and the partition may be removed, and the appliance may then function as a single larger air fryer.

Figure 14:
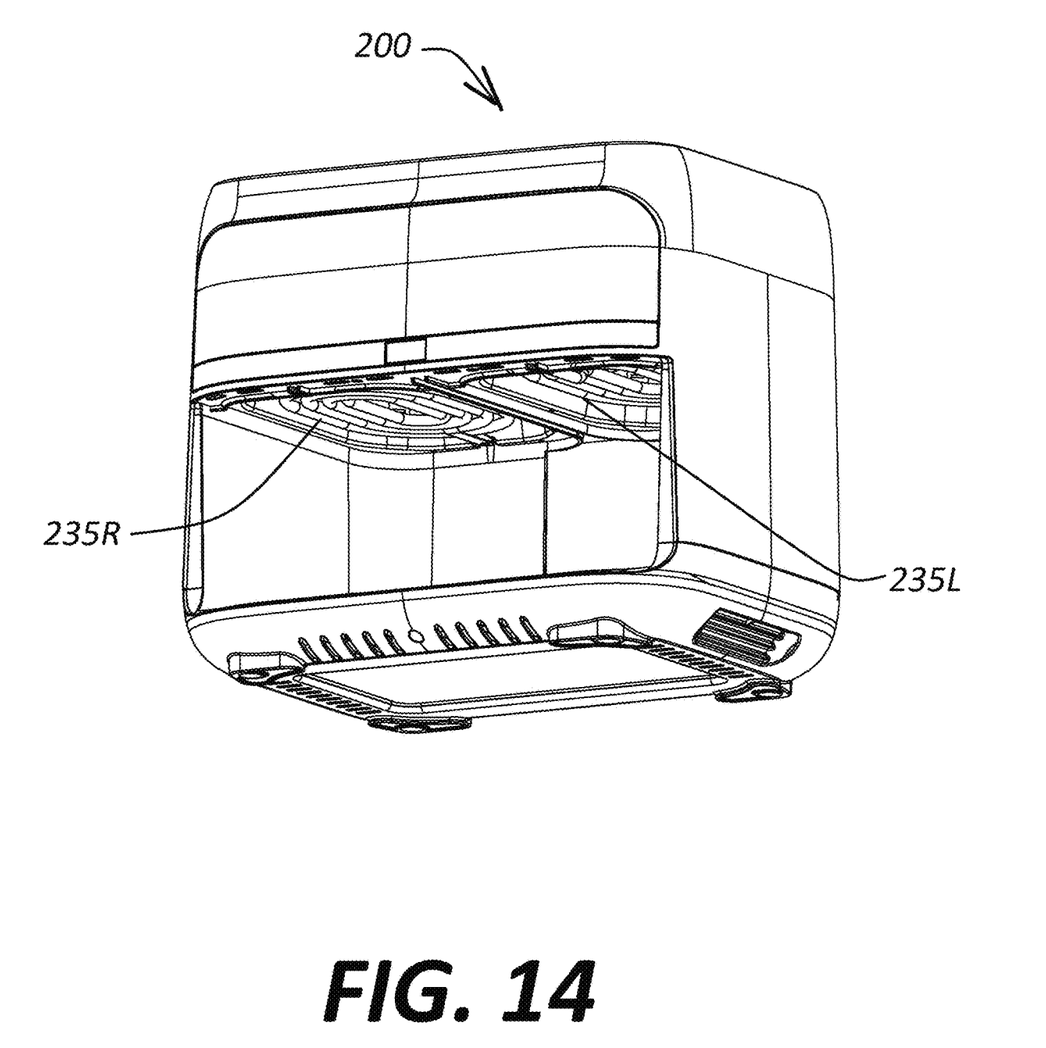
FIG. 14 is a perspective front sectional view through the air fryer of FIG. 13 with the frying pot removed.
Figure 15:
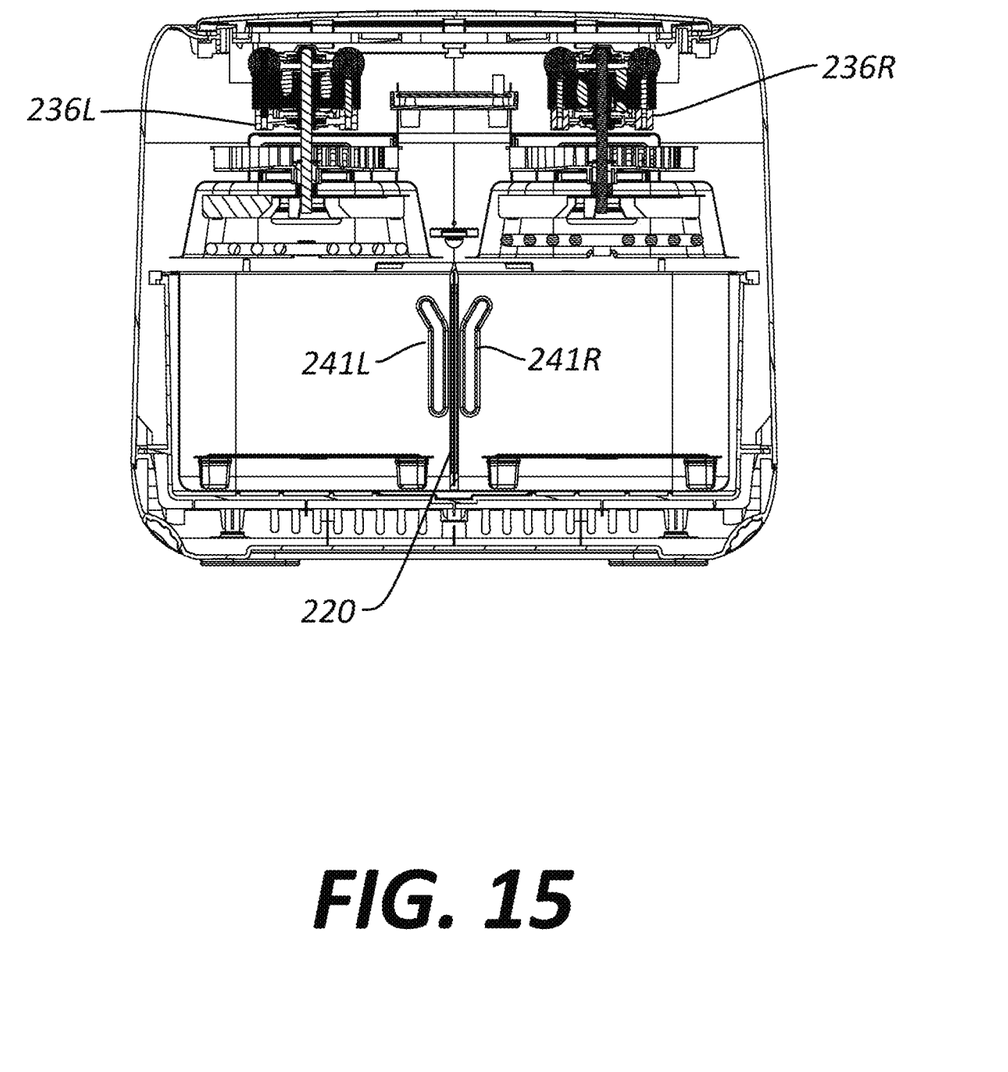
FIG. 15 is a front sectional view taken at line 15-15 of FIG. 13 with the frying pot and the partition installed.
Figure 17:
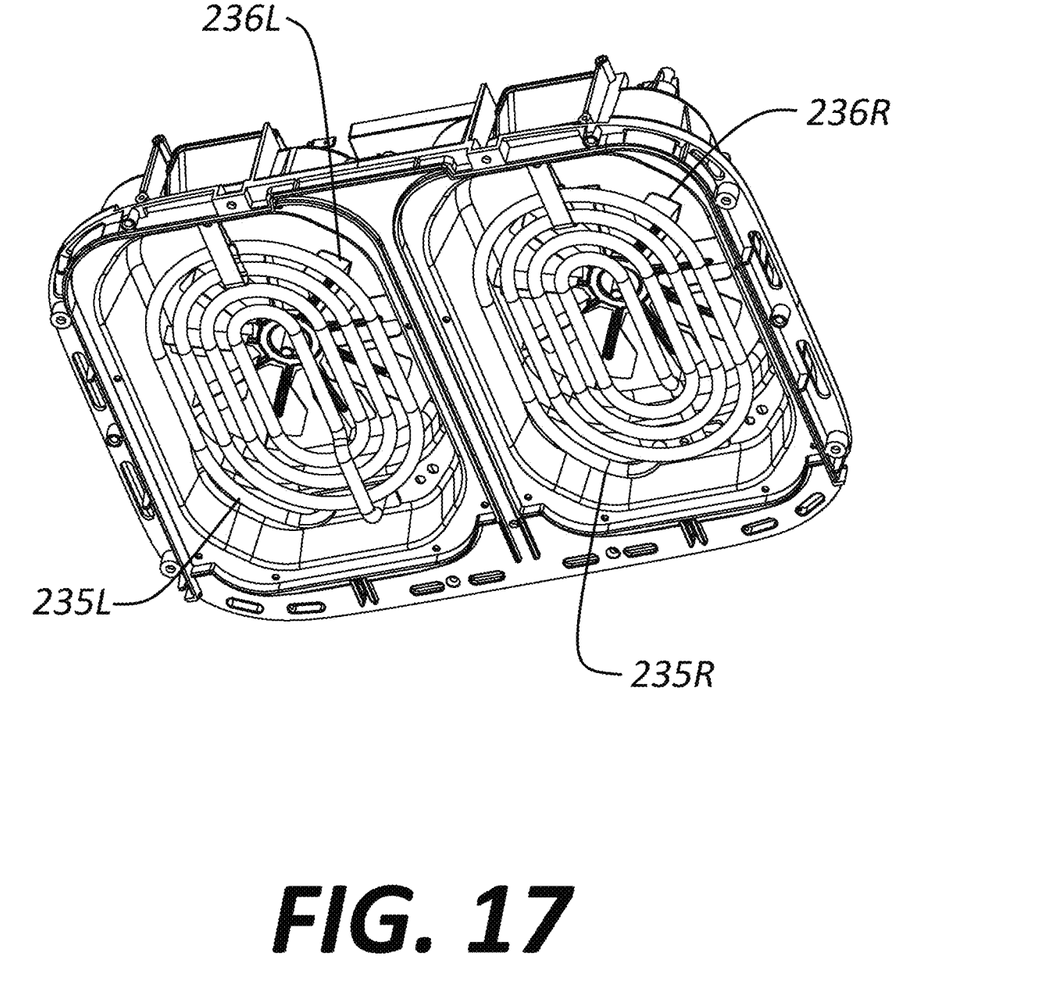
FIG. 17 is a partial bottom perspective view of the heating assembly of the air fryer of FIG. 13.

The left and right air frying systems each include a heating element, 235L and 235R, respectively, and a fan 236L and 236R, respectively. While insulators similar to those of the first embodiment are employed, they are removed from the drawings for clarity.

Figure 16:
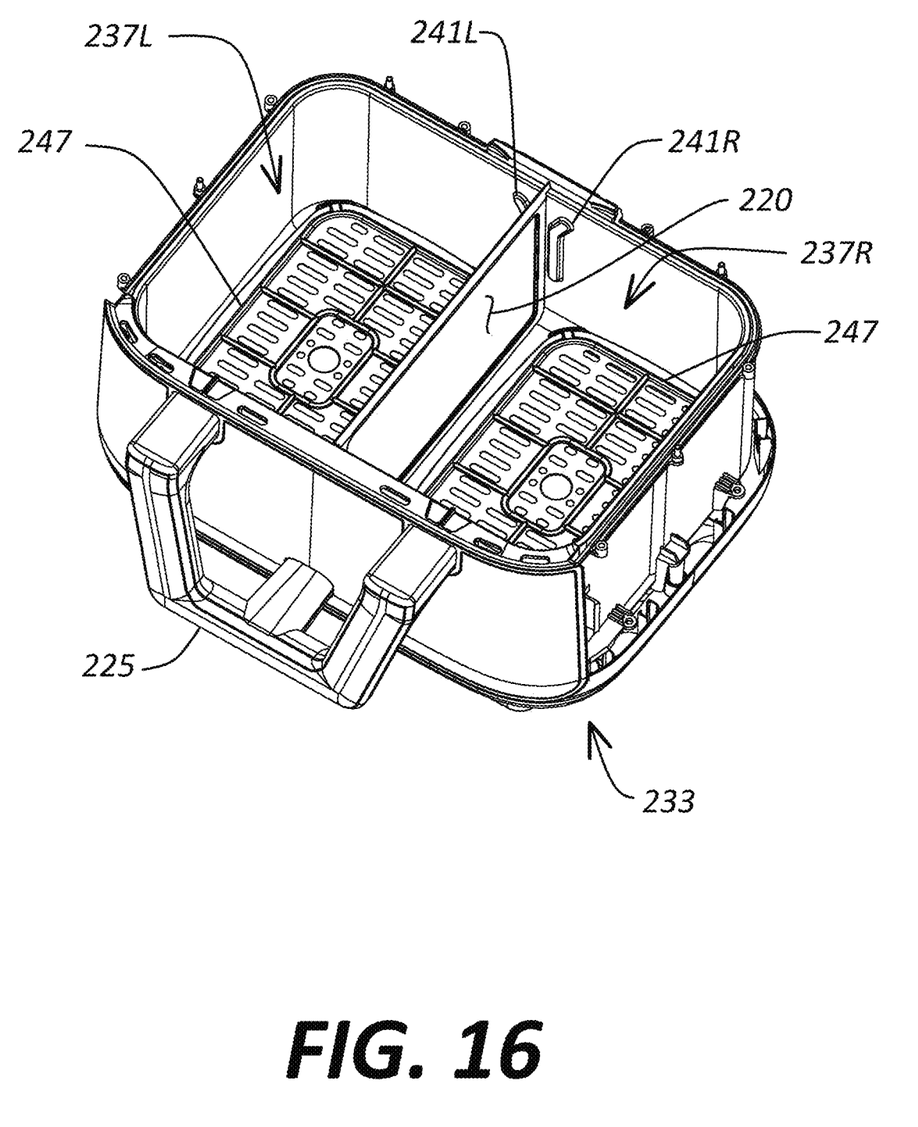
FIG. 16 is a perspective view of the frying pot of the air fryer of FIG. 13 with the partition installed.

The pot includes perforated trays 247 spaced from the pot's bottom surface to support food within the pot and maintain a gap there-under for optimal circulation of the heated air all around the food.

Other features and advantages of the invention will become obvious to those skilled in the art by this description or by use of the described embodiments. It should be understood that the drawings and description are only intended to provide examples of the invention but that the invention should only be limited by the following claims, including all equivalent interpretation to which they are entitled.

I claim:

1. An air frying appliance comprising:
   a housing having an open interior and a plurality of air frying systems each comprising a heating element for heating air and a fan for circulating the heated air;
   one or more removable partitions adapted to create open interior portions equal in plurality to the plurality of air frying systems, each open portion in communication with one of the air frying systems;
   one or more open-topped primary pots adapted for insertion into the open interior and adapted to cooperate with one or all of the air frying systems to create one or more cooking chambers within which the heated air is circulated;
   wherein, each air frying system is controllable to cause one or both of its fan and heating element to operate independently.

2. The air frying appliance of claim 1 wherein the one or more removable partitions are insertable into the open interior to create open interior portions equal in plurality to the plurality of air frying systems, each open interior portion containing one of the air frying systems;
   wherein the one or more open-topped primary pots are equal in plurality to the plurality of air frying systems, each open-topped pot adapted for insertion into one of the open interior portions and to cooperate with that portion's air frying system to create a cooking chamber.

3. The air frying appliance of claim 1 further a comprising a single open-topped alternate pot adapted for alternative insertion into the open interior absent the one or more removable partitions and adapted to cooperate with all of the air frying systems to create one or more cooking chambers within which the heated air is circulated.

4. The air frying appliance of claim 3 wherein all of the air frying systems operate together as one when the single open-topped alternate pot is inserted.

5. The air frying appliance of claim 4 wherein the one or more open-topped primary pots have a curved corner and the one or more removable partitions have a matching curved portion for improving circulation of the heated air within the one or more cooking chambers.

6. The air frying appliance of claim 5 further comprising an insulating barrier disposed between each air frying system and its associated pot and adapted to prevent direct radiant heating of food with the pot by the heating element while allowing circulation of the heated air to the food.

7. The air frying appliance of claim 6 wherein each pot comprises a perforated tray spaced from a bottom surface of the pot and adapted to support the food within the pot while maintaining a gap there-under for optimal circulation of the heated air all around the food.

8. The air frying appliance of claim 1 wherein the one or more open-topped primary pots have a curved corner and the one or more removable partitions have a matching curved portion for improving circulation of the heated air within the one or more cooking chambers.

9. The air frying appliance of claim 8 further comprising an insulating barrier disposed between each air frying system and its associated pot and adapted to prevent direct radiant heating of food with the pot by the heating element while allowing circulation of the heated air to the food.

10. The air frying appliance of claim 9 wherein each pot comprises a perforated tray spaced from a bottom surface of the pot and adapted to support the food within the pot while maintaining a gap there-under for optimal circulation of the heated air all around the food.

* * * * *